United States Patent [19]
Zahora

[11] Patent Number: 5,859,087
[45] Date of Patent: Jan. 12, 1999

[54] RADIATION-CURABLE PRIMER COATING COMPOSITION AND A POLYOLEFIN FILM OR MOLDED ARTICLE COATED WITH THE CURED PRIMER

[75] Inventor: Edward P. Zahora, Naperville, Ill.

[73] Assignee: DSM NV, Netherlands

[21] Appl. No.: 731,611

[22] Filed: Oct. 16, 1996

Related U.S. Application Data

[60] Provisional application No. 60/005,324 Oct. 17, 1995.

[51] Int. Cl.$^6$ ............................... C08F 2/48; C08F 2/46; C08L 75/04; C08L 75/16
[52] U.S. Cl. ........................... 522/96; 522/97; 522/170; 522/173; 522/174; 528/9; 528/56; 528/85; 528/28
[58] Field of Search ............................ 522/96, 103, 107, 522/92, 97, 170, 173, 180, 181, 182, 174, 99; 528/56, 85, 9, 28

[56] References Cited

U.S. PATENT DOCUMENTS

| | | | |
|---|---|---|---|
| 3,380,871 | 4/1968 | Thomas . | |
| 3,754,974 | 8/1973 | Hirota | 117/75 |
| 4,099,837 | 7/1978 | Vazirani | 522/100 |
| 4,495,156 | 1/1985 | Rohowetz . | |
| 4,830,672 | 5/1989 | Yamada et al. | 106/287.19 |
| 4,849,462 | 7/1989 | Bishop . | |
| 4,931,094 | 6/1990 | Barfurth et al. | 106/20 |
| 5,055,378 | 10/1991 | Miyamura et al. | 522/103 |
| 5,146,531 | 9/1992 | Shustack . | |
| 5,178,802 | 1/1993 | Cree et al. | 264/22 |
| 5,204,379 | 4/1993 | Kubota et al. | 522/96 |
| 5,496,635 | 3/1996 | Francis et al. | 428/352 |
| 5,580,614 | 12/1996 | Amberg-Schwab et al. . | |
| 5,728,770 | 3/1998 | Yamamoto et al. | 524/755 |

FOREIGN PATENT DOCUMENTS

| | | |
|---|---|---|
| 0 200 366 | 11/1986 | European Pat. Off. . |
| 0 420 293 A | 4/1991 | European Pat. Off. . |
| 0 524 417 A | 1/1993 | European Pat. Off. . |
| 0 539 030 A1 | 4/1993 | European Pat. Off. . |
| 60-049 382 A | 3/1985 | Japan . |

*Primary Examiner*—Susan W. Berman
*Attorney, Agent, or Firm*—Pillsbury Madison & Sutro LLP

[57] ABSTRACT

Provided is a radiation-curable primer coating composition, which is adapted to provide a printable primer coating on a polyolefin surface that is functionally resistant to delamination from the polyolefin surface over the temperature range from heat pasteurization temperatures to freezer storage temperatures. The primer composition being formulated from the following components:

at least one monomer or oligomer having at least one functional group that polymerizes when exposed to radiation; and an effective amount of at least one zirconate or titanate, or a mixture of a titanate and zirconate, to increase adhesion of the radiation-cured primer coating to said polyolefin surface.

8 Claims, No Drawings

RADIATION-CURABLE PRIMER COATING COMPOSITION AND A POLYOLEFIN FILM OR MOLDED ARTICLE COATED WITH THE CURED PRIMER

This application claims priority to provisional application Ser. No. 60/005,324, filed on Oct. 17, 1995.

1. Field of the Invention

This invention relates to a radiation curable primer coating composition which when suitably cured provides a printable primer coating that exhibits enhanced adhesion to polyolefins. The invention also relates to a polyolefin film or molded article having the cured primer coated on a surface thereof.

2. Background of the Invention

It is difficult to print a colored ink image onto a polyolefin molded article or polyolefin film, in particular polypropylene, and have the ink image retain sufficient adhesion to the surface of the polyolefin. The main problem is that polyolefins, in particular polypropylene, have few or no functional groups to which the ink can typically bind.

To address this problem, it is known to treat the surface of the polyolefins to introduce functional groups thereon to which an ink can bind. Examples of such surface treatments include exposing a surface of the polyolefin to a corona discharge, ultraviolet radiation, heat, flame, or an electron beam, in the presence of air to oxidize the surface of the polyolefin.

Another way to address the problem of adhesion of the ink to the surface of a polypropylene molded article or film is to modify the ink by adding adhesion promoters. An example of such an ink is disclosed in a paper published by the 10th National SAMPE Technical Conference, entitled "White Ink for Video Jet Printing", M. Hill (Oct. 17–19, 1978). This publication discloses an ink composition based on titanium dioxide dispersed in an epoxy acrylate prepolymer formulation that contains silane and titanate coupling agents. The ink composition is UV curable. The ink composition is applied to a black polyethylene jacketed cable for printing identification numbers thereon.

Other examples of printing inks containing adhesion promoters are disclosed in an article entitled "Printing Inks—The Use of Zirconium Based Adhesion Promoters", P. Moles, et al., Chemistry Today (May/June 1994). This article discloses printing inks containing a zirconate that have enhanced adhesion to polyolefins and polyesters.

Further examples of printing inks containing adhesion promoters are disclosed in an article entitled "Zirconium Compounds In Adhesion and Abhesion", J. Comyn, Int. J. Adhesion and Adhesives, Vol. 14, No. 2 (April 1994). This article discloses examples of printing inks containing zirconates for adhesion promotion to polyolefins.

It is inefficient and costly to modify the large number of inks at a printing site for each substrate to be printed. In particular, it is undesirable to modify the large number of inks at a typical printing site to contain adhesion promoters so that the inks can be printed onto polyolefins such as polypropylene. Furthermore, there may be undesirable effects, such as an undesirable color change or an undesirable viscosity change in the inks, when the adhesion promoters are added to the inks.

Another approach to the problem of printing an ink image onto polyolefin films is to use a water-based primer coating composition which when coated on polyolefins, such as polypropylene, provides a primer coating that is printable thereon using conventional inks. However, such water-based primer coating compositions require a significant amount of heat and a significant amount of time to cure and evaporate or otherwise remove the water vehicle. Typically, line speeds of only about 200 to 250 hundred feet per minute can be reached at curing temperatures that can be tolerated by polypropylene. Faster line speeds cannot be achieved by raising the temperature, because polyolefins, such as polypropylene, do not have a high heat resistance.

There is a need for a primer coating composition which can be cured at much greater line speeds, such as about 400 to about 800 hundred feet per minute, that do not contain a vehicle, such as water, that must be removed, that provides enhanced adhesion to polyolefins, and that conventional unmodified inks may be printed thereon.

SUMMARY OF THE INVENTION

An objective of this invention is to provide a fast curing, primer coating composition that after suitable curing exhibits enhanced adhesion to polyolefins, such as polypropylene, and that has the ability of adherently receiving application of printing inks found at a typical printing site.

Another objective of this invention is to provide a primer coating composition that can be cured using radiation and that does not require heat to drive off a vehicle, such as water.

The above objectives and other objectives are obtained by the following.

Surprisingly, it has now been found that a radiation-curable primer coating composition containing a titanate or zirconate provides a fast curing primer coating composition that when suitably cured achieves enhanced adhesion to polyolefins and may be printable thereon using conventional inks.

The primer coating composition comprises at least one monomer or oligomer having a functional group that polymerizes when exposed to radiation, and an effective amount of at least one zirconate and/or titanate to increase adhesion of the radiation cured primer coating to the polyolefin.

The invention also relates to a polyolefin molded article or polyolefin film having on at least one surface a printable, primer coating that in an uncured form comprises a monomer or oligomer having a functional group that polymerizes when exposed to a radiation, and an effective amount of a zirconate or titanate to increase adhesion of the radiation cured primer coating to the polyolefin.

Mixtures of titanates and zirconates can also be used.

DETAILED DESCRIPTION OF PREFERRED EMBODIMENTS

The radiation-curable primer coating composition comprises a monomer or oligomer containing a functional group that can be polymerized through actinic radiation. This functional group can be any group capable of polymerizing under the influence of actinic radiation, for example, ultraviolet or electron-beam radiation. One type of functionality is, for example, an ethylenically unsaturated moiety, which in general may be polymerized through radical polymerization, but also is capable of being polymerized through cationic polymerization. Examples of ethylenically unsaturated moieties are groups containing acrylate, methacrylate, maleate, fumarate, vinylethers, allylethers, styrenic compounds, acrylamide functionality or vinylamide functionality.

Another type of functionality is provided by, for example, epoxy groups, or thiol-ene or amine-ene systems. Epoxy groups, in general, can be polymerized through cationic polymerization, whereas the thiol-ene and amine-ene systems are polymerized through radical polymerization. For example, the epoxy groups can be homopolymerized. In the thiol-ene and amine-ene systems, for example, polymerization can occur between a group containing allylic unsaturation and a group containing a tertiary amine or thiol.

Preferably, the functional group is an acrylate group, a methacrylate group, or a vinylether group. Most preferably, the functional group is an acrylate group.

Monomers and oligomers for use in radiation curable coating compositions are well known in the art. The composition of the present invention contains an amount of monomer or oligomer from 5–80 wt. %, relative to the total amount of the composition. Various examples of such monomers and oligomers are disclosed in U.S. Pat. Nos. 4,849,462 or 5,146,531, which are incorporated herein by reference.

Suitable mono-functional monomers include: acrylic compounds such as 2-hydroethyl acrylate, 2-hydropropyl acrylate, tetrahydrofurfuryl acrylate, butoxyethyl acrylate, ethyldiethyleneglycol acrylate, 2-ethylhexyl acrylate, cyclohexyl acrylate, dicyclopentadiene acrylate, methyltriethyleneglycol acrylate, diethylaminoethyl acrylate, 7-amino-3,7-dimethyloctyl acrylate and the like; 2-hydroxypropyl methacrylate, polypropyleneglycol methacrylate, diethylaminoethyl methacrylate, and the like; vinyl pyrolidone, vinyl phenol, acrylamide, vinyl ether, styrene, and compounds represented by the general formula:

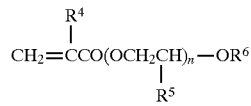

wherein $R^4$ is a hydrogen atom or methyl group, $R^5$ is a hydrogen atom or methyl group, $R^6$ is $C_1$–$C_8$ alkyl group or alkylphenyl group containing a $C_1$–$C_{12}$ alkyl group, and n is an integer of 1 to 12.

Suitable poly-functional monomers include:
trimethylolpropane triacrylate, ethyleneglycol diacrylate, tetraetyleneglycol diacrylate, polyethyleneglycol diacrylate, 1,4-butanediol diacrylate, 1,6-hexanediol diacrylate, neopentylglycol diacrylate, polyester diacrylate, diallyl adipate, diallyl phthalate and triallyl isocyanurate.

Suitable oligomers include urethane-acrylates, which are derived from the reaction of a polyol, an organic diisocyanate and an ethylenically unsaturated monomer containing a (usually single) hydroxyl group(s), typically a hydroxy-functional (meth)acrylate ester (in some cases, an isocyanate-functional (meth)acrylate ester is used in place of a diisocyanate and hydroxy-functional (meth)acrylate ester.

The polyol component of the urethane-acrylate oligomer is often a polyether polyol, a polyester polyol, a polycarbonate polyol or a polysiloxane polyol. Such oligomeric polyols will have an average of at least two hydroxyl groups per molecule, which are usually located at least at the ends of the oligomer molecule, thereby allowing the polyol to take part in urethane synthesis.

Preferably, the monomer or oligomer selected is substantially-free of functional groups that will react with the titanate under ambient storage and working conditions, thus reducing the ability of the titanate to bind to the surface of the polypropylene. Examples of such functional groups include hydroxyl groups.

The radiation-curable primer coating composition of this invention contains an effective amount of at least one zirconate and/or titanate to increase adhesion of the radiation cured primer coating to the polyolefin. If a colorless primer coating is desired a zirconate should be used as the adhesion promoter.

One skilled in the art will understand and be able to determine from reading and comprehending this disclosure what amounts of zirconate and/or titanate should be used to provide enhanced adhesion of the radiation-cured primer coating to the polyolefin surface. It has been found that, generally, suitable amounts of the zirconate and/or titanate are about 0.1 to about 10% based on the total weight of the primer coating composition. More preferably, the amount of the titanate or zirconate is between about 0.5 and about 5% by weight.

Examples of suitable titanates and zirconates are disclosed in "Silicone, Germanium, Tin, and Lead Compounds, Metal Alkoxides Diketonates and Carboxylates", B. Arkles, Ed., Gelest, Inc. (1995).

Specific examples of suitable zirconates include:
zirconium tetra-n-butoxide;
zirconium tetra-t-butoxide;
zirconium di-n-butoxide(bis-2,4-pentanedionate);
zirconium dimethacrylate dibutoxide;
zirconium tetraethoxide;
zirconium tetraisopropoxide;
zirconium tetra-n-propoxide;
zirconium tetra-2-ethylhexoxide; and
zirconium 2,4-pentanedionate.

Specific examples of suitable titanates include:
titanium acetyl acetonate,
titanium bis(triethanolamine)-diisoperoxide;
titanium tetra-n-butoxide;
titanium di-n-butoxide(bis-2,4-pentanedionate);
titanium tetraethoxide;
titanium tetraisopropoxide;
titanium tetraisobutoxide;
titanium methacrylate triisopropoxide; and
titanium tetra-n-propoxide.

The primer coating composition of this invention can also contain a reactive diluent having a functional group which is capable of reacting with the functional group of the monomer or oligomer. The functional group of the reactive diluent may be the same functional group as described above for the monomer or oligomer.

In general, the reactive diluent is used in the coating composition to lower the viscosity and/or to provide required properties, such as hardness and refractive index. Reactive diluents preferably have a molecular weight of less than about 550 or a viscosity at room temperature of less than about 300 mPa.s (measured as 100% diluent).

It has been found that suitable amounts of the reactive diluent are less than about 80% by weight, more preferably, between about 10% by weight and about 80% by weight.

Preferably, the reactive diluent comprises a monomer or monomers having an acrylate, N-vinyl, and/or vinyl ether functionality, and an $C_4$–$C_{20}$ alkyl or polyether moiety. Examples of such reactive diluents include:
hexyl acrylate,
2-ethylhexyl acrylate,
isobornyl acrylate,
decyl acrylate,
lauryl acrylate,
stearyl acrylate,
ethoxyethoxy-ethyl acrylate,
laurylvinyl ether,
2-ethylhexylvinyl ether,
N-vinyl formamide,
isodecyl acrylate, isooctyl acrylate,
vinyl-caprolactam,
N-vinylpyrrolidone, and the like.

This type of reactive diluent preferably is present in an amount between about 1 and about 35 wt. %.

The reactive diluent can contain two groups capable of polymerization using actinic radiation. A diluent having three or more of such reactive groups can be present as well. Examples of such monomers include:
$C_2$–$C_{18}$ hydrocarbondiol diacrylates;
$C_4$–$C_{18}$ hydrocarbondivinyl ethers;
$C_3$–$C_{18}$ hydrocarbon triacrylates;
the polyether analogues thereof, and the like, such as 1,6-hexanediol diacrylate;
trimethylolpropane triacrylate;
hexanedioldivinyl ether;
triethyleneglycol diacrylate;
pentaerythritol triacrylate;
ethoxylated bisphenol-A diacrylate; and
tripropyleneglycol diacrylate.

If the functional group present on the monomer or oligomer is an epoxy group, for example, one or more of the following compounds can be used as the reactive diluent:
epoxy-cyclohexane;
phenylepoxyethane;
1,2-epoxy-4-vinylcyclohexane;
glycidylacrylate;
1,2-epoxy-4-epoxyethyl-cyclohexane;
the diglycidylether of polyethylene-glycol;
the diglycidylether of bisphenol-A;
and the like.

If the functional group present on the monomer or oligomer is an amine or thiol, examples of coreactive diluents having allylic unsaturation that can be used include:
diallylphthalate;
triallyltrimellitate;
triallylcyanurate;
triallylisocyanurate;
and diallylisophthalate.

For the amine-ene systems, amine functional diluents that can be used include, for example:
the adduct of trimethylolpropane, isophorone diisocyanate and dimethylethanolamine;
the adduct of hexanediol, isophorone diisocyanate and dipropylethanolamine; and
the adduct of trimethylolpropane, trimethylhexamethylene diisocyanate and dimethylethanolamine.

The primer coating composition can also contain a photoinitiator. The photoinitiator is useful for an ultraviolet radiation-cure. In other embodiments, for example, when using an electron beam cure of a free radical system, the photoinitiator can be omitted. In cationally cured systems, however, a photoinitiator is useful even when performing an electron beam cure.

The photoinitiator, when used in an effective amount to promote radiation cure, preferably provides a reasonable cure speed while substantially avoiding premature gelling of the composition. The desired cure speed will depend on the application of the coating and a skilled artisan will easily be able to adjust the amount and type of photoinitiator to obtain the optimum cure speed. The type of photoinitiator that is used will be dependent on whether a free radical-type system or a cationic cure type-system is used.

Examples of free radical-type photoinitiators include, but are not limited to, the following:
hydroxycyclohexylphenyl ketone;
hydroxymethylphenylpropanone;
dimethoxyphenylacetophenone;
2-methyl-1-[4-(methyl thio)-phenyl]-2-morpholinopropanone-1;
1-(4-isopropylphenyl)-2-hydroxy-2-methylpropan-1-one;
1-(4-dodecyl-phenyl)-2-hydroxy-2-methylpropan-1-one;
4-(2-hydroxyethoxy)phenyl-2(2-hydroxy-2-propyl)-ketone;
diethoxyphenyl acetophenone;
2,4,6 trimethylbenzoyl diphenylphosphone;
a mixture of (2,6-dimethoxy benzoyl)-2,4,4 trimethylpentylphosphineoxide and 2-hydroxy-2-methyl-1-phenyl-propan-1-one; and
mixtures of these.

Examples of cationic cure-type photoinitiators include, but are not limited to, onium salts such as iodonium, sulfonium, arsonium, azonium, bromonium, or selenonium. The onium salts are preferably chemically modified to render them more hydrophobic, for example, by incorporating saturated hydrocarbon moieties such as alkyl or alkoxy substituents of from about 4 to about 18 carbon atoms. Preferred cationic cure initiators include:
(4-octyloxyphenyl)phenyl iodonium hexafluoro antimonate;
(4-octyloxyphenyl)diphenyl sulfonium hexafluoro antimonate;
(4-decyloxyphenyl)phenyl iodonium hexafluoro antimonate; and
(4-octadecyloxyphenyl)phenyl iodonium hexafluoro antimonate.

The primer coating composition may include further additives. Examples of suitable additives include flow agents and surfactants that are well known in art to improve the uniformity and appearance of the cured primer coating.

The examples of primer coating compositions set forth above are intended only to be illustrative of the primer coating compositions that may be employed in the present invention.

The present invention contemplates a polyolefin molded article or polyolefin film having a surface that is coated with at least one cured primer coating composition.

In producing the primer coated polyolefin film or polyolefin molded article, the liquid primer coating composition can be applied by any suitable well known means to a surface of the molded article or film and subsequently cured. The cure can be affected, for example, by applying ultraviolet or visible radiation. Alternatively, the coating can be cured by electron beam irradiation in which event no photoinitiator is required.

To increase the adhesion of the primer coating to the polyolefin film or article, the surface of the polyolefin film or article can be pretreated as is generally known in the art. One skilled in the art will easily be able to test commercially available, surface-treated polyolfin films or articles for those that provide the desired level of adhesion to the selected primer coating composition.

Preferably, the surface of the polyproplyene is oxidized prior to application of the primer coating. Any conventional surface treatment for oxidizing the surface of the polypropylene can be used. Examples of suitable surface treatments include exposing the surface of the polypropylene to a corona discharge, ultraviolet radiation, heat, flame or an electron beam in the presence of oxygen. Without being bound by any theory, it is believed that the zirconate or titanate is capable of binding to the oxidized surface of the polypropylene. For example, hydroxyl groups or carboxylic acid groups formed during oxidation of the polypropylene surface are capable of binding with the titanate or zirconate.

Conventional printing inks can be printed on the primer coated polyolefin molded article or polyolefin film and the adhesion of the ink to the primer coating and the adhesion of the primer coating to the polyolefin is adequate to withstand immersion in ice cold or boiling hot water without delamination occurring. Furthermore, the primer coating can be made clear, as described above. Thus, the primer coating can be used on a clear beverage or food container and an ink image or label printed thereon that will withstand the hot pasteurization of the beverage or food contents within the container as well as the freezing or cold storage of the beverage or food within the container during storage.

The invention will be further explained by the following non-limiting examples.

EXAMPLE 1 AND COMPARATIVE EXAMPLES A–C

Three comparative radiation-curable coating compositions and one example of a radiation-curable primer coating composition according to the present invention were made by combining the ingredients shown in Table 1. Four samples of biaxially-oriented polypropylene films (type A), each in the shape of a 5 inch diameter disk, were surface-treated by exposing them to 2.0 J/cm$^2$ of ultraviolet light from a 300 watt/inch Fusion D lamp (Fusion Systems, Inc.), in air, which treatment oxidized the surface of the polypropylene films to add oxygen containing functional groups. The surface-treated polypropylene films were then spin coated with the indicated coating composition. The coatings were cured by exposing them to 0.3 J/cm$^2$ of ultraviolet light from a 600 watt/inch Fusion D lamp, in a nitrogen atmosphere. The adhesion of the cured coatings to the polypropylene films was tested using the ASTM D 3359 test procedure. The color of the cured primer coating compositions was measured by the naked eye. The test results are shown in Table 1.

one which was surface-treated as above and another which was not surface-treated. The primer coating composition was also coated and cured on two polypropylene films of type B, one which was surface-treated as above and another which as not surface-treated. Film A and film B received different proprietary pretreatements from the manufacturer. The initial surface tension of Film A was measured to be 38 dynes while film B was 36 dynes.

The Adhesion of the cured primer coatings to the polypropylene films was tested in the same manner as above. The results are shown in Table 2.

TABLE 2

| Substrate | Film B | Film B | Film A | Film A |
|---|---|---|---|---|
| Surface-treatment | No | Yes | No | Yes |
| Adhesion | 0% | 0% | 0% | 100% |

The results in Table 2 demonstrate that the surface-treatment of the polypropylene film A increased the adhesion between the cured primer coating and the polypropylene film type A. The surface-treatment had no effect on the polypropylene film type B.

EXAMPLE 2

A primer coating composition according to the present invention was made by combining the ingredients shown in Table 3. The color of the primer coating composition was measured using ASTM D1544. The results are shown in Table 3.

A polypropylene film, type A, was surface-treated as in Example 1. The coating composition was applied and cured on the surface-treated polypropylene film, type A, in the

TABLE 1

| Material (weight % based on total composition weight) | Comparative Example A | Comparative Example B | Comparative Example C | Example 1 |
|---|---|---|---|---|
| Urethane Acrylate Oligomer[1] | 20 | 20 | 20 | 20 |
| Trimethylolpropane Triacrylate (SR 351, Sartomer) | 63 | 63 | 63 | 68 |
| 1-Propanethiol,3-Trimethoxysilyl (A-189, OSI) | 10 | | | |
| Methacyloxypropyl Trimethoxysilane (Dynasylan Memo, Huls) | | 10 | | |
| Tetraethoxy Silane (Huls) | | | 10 | |
| Titanium Acetyl Acetonate (TIACA, Huls) | | | | 5 |
| 2-Hydroxy-2-Methyl-1-Phenyl-1-Propanone (Durocure 1173, Ciba Geigy) | 7 | 7 | 7 | 7 |
| Test Results | | | | |
| Adhesion Tape 5910 (%) | 0 | 0 | 40 | 100 |
| Color | Clear | Clear | Clear | Light Brown Tint |

The urethane acrylate oligomer[1] was made by combining 2-hydroxy ethyl acrylate (Dow); IPDI (Olin): carbonic acid, polymer with alkane diol (KM-10-1733, Stahl); BHT (Fitz Chemical); dibutyltin dilaurate (Autochem); and isobornyl acrylate (SR 506, Sartomer) under suitable reaction conditions which are known by one skilled in the art.

The results in Table 1 demonstrate that the cured primer coating according to the present invention, which contained a titanate, exhibited excellent adhesion to the surface-treated polypropylene film. In contrast, the cured coatings of the comparative examples, which contained typical adhesion promoters, did not provide sufficient adhesion to the polypropylene.

The primer coating composition used in Example 1 above was coated and cured on two polypropylene films of type A, same manner as in Example 1. The color of the cured primer coating was measured four times at different locations on the sample using a Macbeth color eye. The range of color readings obtained is shown in Table 3.

The cured primer coating was then surface-treated by exposing the primer coating four times to 0.42 J/cm$^2$ of ultraviolet light from a 300 watt/inch Fusion D lamp, in air. A UV curable orange ink image was silkscreened onto the surface-treated primer coating. The ink image was cured by exposing the ink image to 0.35 J/cm² of ultraviolet light from a 300 watt/inch Fusion D lamp, in air. The adhesion of the cured ink image to the primer coating and the adhesion of the primer coating to the polypropylene was tested in the same manner as above. The sample was cut in half. One half of the sample was soaked in hot water for fifteen minutes at a temperature of 200° F., and then the adhesion of the cured ink and the cured primer coating to the polypropylene was measured in the same manner as above. The other half of the sample was soaked in ice water for twenty-four hours, and then the adhesion of the cured ink and the cured primer coating to the polypropylene was tested in the same manner as above. The results are shown in Table 3.

TABLE 3

| Material | Amount (% by weight) |
|---|---|
| Trimethylolpropane Triacrylate (SR 351 Monomer, Sartomer) | 72.0 |
| Aliphatic Urethane Acrylate Oligomer (CN 965, Sartomer) | 20.0 |
| 2-hydroxy-2-methyl-1-phenyl-1-propanone (Durocur 1173, Ciba Geigy) | 7.0 |
| n-Butylzirconate (TBZ, Huls) | 1.0 |
| Total | 100.0 |

| Test | Results |
|---|---|
| Adhesion | 100 |
| Adhesion after immersion in hot water | 100 |
| Adhesion after immersion in ice water | 98 |
| Color of cured primer coating (LAB reading from Macbeth color eye following ASTM E 1164) | .38 to .46 |
| Color of uncured primer coating (ASTM D 1544) | 1 |
| Viscosity of primer composition | 504 mPa · s (25° C.) |

The cured ink and primer coating, according to Example 2, exhibited excellent adhesion to polypropylene film type A after exposure to both ice water and hot water. The color of the cured primer coating was clear to the naked eye. Typically, a delta B value less than 0.45, as measured with a calorimeter, is indistinguishable to the naked eye on a completely clear surface.

The results in Table 3 demonstrate that the cured primer coatings according to this invention can be used on clear polypropylene molded articles or films to provide a surface which adherently accepts application of a conventional ink image. Furthermore, the primer coatings retain sufficient adhesion to ink images and polypropylene under ice cold and hot water conditions. Thus, the primer coatings are well suited for commercial food wraps or containers where the food is heat pasteurized or stored in ice c old conditions.

EXAMPLES 3–6 AND COMPARATIVE EXAMPLE D

Four primer coating compositions according to the present invention and one comparative coating composition were made by combining the ingredients shown in Table 4. Five polyproplyene films, type A, were surface-treated in the same manner as in Example 1. Each of the coating compositions was applied and cured on a corresponding surface-treated polypropylene film in the same manner as in Example 1. The adhesion and color of the cured coatings was measured in the same manner as in Example 1. The results are shown in Table 4.

TABLE 4

| Material | Example 3 | Example 4 | Example 5 | Example 6 | Comparative Example D |
|---|---|---|---|---|---|
| Urethane Acrylate Oligomer² | 20.0 | 20.0 | 20.0 | 20.0 | 20.0 |
| Trimethylolpropane Triacrylate (SR 351 Monomer, Sartomer) | 69.0 | 70.0 | 71.0 | 72.0 | 73.0 |
| Titanium Acetyl Acetonate (TIACA, Huls) | 4.0 | 3.0 | 2.0 | 1.0 | 0.0 |
| 2-Hydroxy 2-Methyl 1-Phenyl 1-Propanone | 7.0 | 7.0 | 7.0 | 7.0 | 7.0 |
| Test Results | | | | | |
| Adhesion (%) | 100 | 100 | 100 | 100 | 60 |
| Color Determined By Naked Eye | Clear | Clear | Clear | Clear | Clear |
| Viscosity | | | | 430 mPa · s | |

The urethane acrylate oligomer² was made by combining 2-hydroxy ethyl acrylate (Dow); IPDI (Olin); carbonic acid, polymer with alkane diol (KM-10-1733, Stahl); BHT (Fitz Chemical); dibutyltin dilaurate (Autochem); and isobornyl acrylate (SR 506, Sartomer) under suitable reaction conditions which are known by one skilled in the art.

The results in Table 4 demonstrate that when between about 1 and about 4% by weight of a titanate was added to the primer coating composition, the adhesion between the surface-treated polypropylene film type A and the cured primer coating was significantly improved. In particular, 100% of the primer coating remained after testing.

In contrast, the same primer coating composition, without a titanate, when coated and cured on the surface-treated polypropylene did not exhibit sufficient adhesion. Only 60% of the cured primer coating remained after testing.

EXAMPLES 7–9

Three primer coating compositions according to the claimed invention were made by combining the ingredients shown in Table 5. The viscosity of the primer coating compositions was measured. The measurements are shown in Table 5.

Three polyproplyene films, type A, were surface-treated in the same manner as in Example 1. Each of the primer coating compositions was applied and cured on a corresponding surface-treated polypropylene film in the same manner as in Example 1. The adhesion of the cured primer coatings to the surface-treated polypropylene films was tested in the same manner as in Example 1. The results are shown in Table 5.

TABLE 5

| Material | Example 7 | Example 8 | Example 9 |
| --- | --- | --- | --- |
| Allphatic Polyester Urethane Acrylate Ollgomer (CN 965, Sartomer) | 20.0 | | |
| Allphatic Polyether Urethane Acrylate Ollgomer (CN 980, Sartamer) | | 20.0 | |
| Aromatic Polyether Urethane Acrylate Ollgomer (CN 971, Sartomer) | | | 20.0 |
| Trimethylolpropane Triacrylate (SR 351 Monomer, Sartomer) | 72.0 | 72.0 | 72.0 |
| Titanium Acetyl Acetonate (TIACA, Huls) | 1.0 | 1.0 | 1.0 |
| 2-Hydroxy-2-Methyl 1-Phenyl-1-Propanane (Darocur 1173, Ciba Geigy) | 7.0 | 7.0 | 7.0 |
| Test Results | | | |
| Adhesion(%) | 100 | 100 | 100 |
| Viscosity (mPa · s) | 438 | 555 | 495 |

The results in Table 5 demonstrate that the use of a titanate in the primer coating composition significantly increases the adhesion of the cured primer coating to surface-treated polypropylene, when significant amounts of aliphatic and/or aromatic polyether urethane oligomers, or aliphatic polyester urethane oligomers, are used in the coating composition.

EXAMPLES 10–12

Three primer coating compositions according to the present invention were made by combining the ingredients shown in Table 6. The viscosity of the primer coating compositions was measured. The measurements are shown in Table 6.

Three polyproplyene films, type A, were surface-treated in the same manner as in Example 1. Each of the primer coating compositions was applied and cured on a corresponding surface-treated polypropylene film in the same manner as in Example 1. The adhesion of the cured primer coatings to the surface-treated polypropylene films was tested in the same manner as in Example 1. The results are shown in Table 6.

TABLE 6

| Material | Example 10 | Example 11 | Example 12 |
| --- | --- | --- | --- |
| Aromatic Polyether Urethane Acrylate Oligomer (CN 972, Sartomer) | 20.0 | | |
| Epoxy Acrylate Oligomer (Photomer 3016, Henkel) | | 20.0 | |
| Epoxy Acrylate Oligomer (CN 124, Sartomer) | | | 20.0 |
| Trimethylolpropane Triacrylate (SR 351 Monomer, Sartomer) | 72.0 | 72.0 | 72.0 |

TABLE 6-continued

| Material | Example 10 | Example 11 | Example 12 |
| --- | --- | --- | --- |
| Titanium Acetyl Acetonate (TIACA, Huls) | 1.0 | 1.0 | 1.0 |
| 2-Hydroxy-2-methyl 1-phenyl-1-propanone (Darocur 1173, Ciba Geigy) | 7.0 | 7.0 | 7.0 |
| Test Results | | | |
| Adhesion (%) | 100 | 80 | 50 |
| Viscosity (mPa · s) | 428 | | |

The results in Table 6 demonstrate that the use of 1% by weight a titanate in the primer coating composition significantly increases the adhesion of the cured primer coating to surface-treated polypropylene. When significant amounts of an aromatic polyether urethane oligomer is used in the coating composition adhesion was good. However, when the coating composition contained significant amounts of epoxy acrylate oligomers, suitable adhesion of the cured coating to the surface-treated polypropylene may require greater amounts of the titanate or zirconate.

EXAMPLE 13 AND COMPARATIVE EXAMPLE E

Two primer coating compositions were made by combining the ingredients shown in Table 7. The viscosity of Example 13 was measured. The measurement is shown in table 7.

Two polyproplyene films, type A, were surface-treated in the same manner as in Example 1. Each of the primer coating compositions was applied and cured on a corresponding surface-treated polypropylene film in the same manner as in Example 1. The adhesion of the cured primer coatings to the surface-treated polypropylene films was tested in the same manner as in Example 1. The results are shown in Table 7.

TABLE 7

| Material | Example 13 | Comparative Example E |
| --- | --- | --- |
| Polyester Acrylate Oligomer (Photomer 5018, Henkel) | 20.0 | |
| Acrylic Acrylate Oligomer (Ebecryl 769, Radcure) | | 35.0 |
| Trimethylolpropane Triacrylate (SR 351 Monomer, Sartomer) | 72.0 | 57.0 |
| Titanium Acetyl Acetonate (TIACA, Huls) | 1.0 | 1.0 |
| 2-Hydroxy-2-methyl 1-phenyl-1-propanone (Darocur 1173, Ciba Geigy) | 7.0 | 7.0 |
| Test Results | | |
| Adhesion (%) | 100 | 0 |
| Viscosity (mPa · s) | 113 | |

The results in Table 7 demonstrate that the use of a titanate in the primer coating composition significantly increases the adhesion of the cured primer coating to surface-treated polypropylene, when significant amounts of a polyester acrylate oligomer is used in the coating composition. Without being bound by any theory, it is believed that the acrylic acrylate oligomer used in comparative example E contained functional groups, such as residual hydroxyl groups, which may have reacted with the titanate, thus reducing the titanates ability to bond with the surface of the polypropylene.

Suitable adhesion between the coating and the polypropylene may have been obtained if the amount of titanate was increased.

EXAMPLES 14 AND 15

Two primer coating compositions according to the present invention were made by combining the ingredients shown in Table 8. The viscosity, the color (ASTM D1544), and weight/gallon was measured for each of the coating compositions. The measurements are shown in Table 8.

The stability of the primer coating compositions was then tested by heating the primer coating compositions to 54.4° C. for 30 days, and then subjecting the coating compositions to 5 cycles of freezing and thawing. The results are shown in Table 8.

TABLE 8

| Material | Example 14 | Example 15 |
|---|---|---|
| Reactive Amine Co-initiator (CN 383, Sartomer) | 15.0 | 15.0 |
| Aliphatic Polyester Acrylate Oligomer (Photomer 5018, Henkel) | 20.0 | |
| Aliphatic Polyester Urethane Acrylate Oligomer (CN 965, Sartomer) | | 20.0 |
| Trimethylolpropane Triacrylate (SR 351 Monomer, Sartomer) | 56.0 | 56.0 |
| Titanium Acetyl Acetonate (TIACA, Huls) | 1.0 | 1.0 |
| Benzophenone (Velsicol) | 8.0 | 8.0 |
| Test Results | | |
| Initial Viscosity (mPa · s) | 77 | 235 |
| Color of Uncured Coating Composition (ASTM D1544) | 10 | 11 |
| Weight Gallon of Uncured Coating Composition | 9.11 | 9.15 |
| Viscosity after 30 Days at 54.4° C. | gelled | 253 |
| Viscosity after 5 Cycles of Freezing and Thawing | did not gel | did not gel |

The results in Table 8 demonstrate that the use of a titanate, in place of a zirconate, resulted in a coating composition which was not clear. The color standard was 11, which is very high in color.

Example 15 had very good stability to both exposure to prolonged heat and cycles of hot and ice cold temperatures. The aliphatic polyester acrylate oligomer used in Example 14, has an acid number of 30 mg KOH/gm, which may have accounted for the gelling of Example 14 during exposure to heat.

The use of benzophenone provides a coating composition which can be cured in the presence of air. A nitrogen atmosphere is not required to cure the coating compositions in Examples 14 and 15.

Test Procedures

Viscosity

The viscosity was measured using a Physica MC10 Viscometer. The test samples were examined and if an excessive amount of bubbles was present, steps were taken to minimize the amount of bubbles.

The instrument was set up for the conventional Z3 system, which was used. The samples were loaded into a disposable aluminum cup by using the syringe to measure out 17 cc. The sample in the cup was examined and if it contains an excessive amount of bubbles, they were removed by a direct means such as centrifugation, or enough time was allowed to elapse to let the bubbles escape from the bulk of the liquid. Bubbles at the top surface of the liquid are acceptable.

The bob was gently lowered into the liquid in the measuring cup, and the cup and bob were installed in the instrument. The sample temperature was allowed to equilibrate with the temperature of the circulating liquid by waiting five minutes. Then, the rotational speed was set to a desired value which will produce the desired shear rate. The desired value of the shear rate is easily determined by one of ordinary skill in the art from an expected viscosity range of the sample.

The instrument panel read out a viscosity value, and if the viscosity value varied only slightly (less than 2% relative variation) for 15 seconds, the measurement was complete. If not, it is possible that the temperature had not yet reached an equilibrium value, or that the material was changing due to shearing. If the latter case, further testing at different shear rates will be needed to define the samples viscous properties.

I claim:

1. A radiation curable primer coating composition wherein said primer composition comprises:
   (a) at least one monomer or oligomer derived from a non-aromatic polyisocyanate, having at least one functional group which is polymerized when exposed to radiation;
   (b) an effective adhesion promoting amount of at least one zirconate;
   (c) reactive diluent having a functional group which is capable of reacting with at least one said functional group of the monomer or oligomer; and
   (d) optionally a photoinitiator compound;
   wherein the radiation-curable primer composition when applied to a polyolefin substrate and cured is resistant to delamination and provides a printable surface.

2. A radiation-curable primer coating composition according to claim 1, wherein said functional group comprises ethylenic unsaturation.

3. A radiation-curable primer coating composition according to claim 1, wherein said functional group comprises an acrylate or methacrylate functional group.

4. The radiation-curable primer composition of claim 1, wherein the reactive diluent is present in an amount of not more than 80 wt. %, relative to the total amount of the composition.

5. The radiation-curable primer composition of claim 4, wherein the reactive diluent is present in an amount from 1–35 wt. %, relative to the total amount of the composition.

6. The radiation-curable primer composition of claim 5, wherein the reactive diluent is at least one compound selected from the group ethylhting of: hexyl acrylate, 2-ethylhexyl acrylate, isobornyl acrylate, decyl acrylate, lauryl acrylate, stearyl acrylate, ethoxyethoxy-ethyl acrylate, laurylvinyl ether, 2-ethylhexylvinyl ether, N-vinyl formamide, isodecyl acrylate, isooctyl acrylate, vinyl-caprolactam and N-vinylpyrrolidone.

7. The radiation-curable primer composition of claim 1, wherein at least one of said zirconate is present in an amount from 0.1–20 wt. %, relative to the total amount of the composition.

8. The radiation-curable primer composition of claim 1, wherein the at least one monomer or oligomer is present in an amount from 5–80 wt. %; the at least one of zirconate is present in an amount from 0.1–20 wt. %; and the reactive diluent is present in an amount from 1–35 wt. %, relative to the total amount of the composition.

* * * * *